US009665779B2

(12) United States Patent
Ooi

(10) Patent No.: US 9,665,779 B2
(45) Date of Patent: May 30, 2017

(54) BOUNDARY-LINE-DETECTING DEVICE, BOUNDARY-LINE-DEVIATION DETECTING DEVICE, AND BOUNDARY-LINE-DETECTION PROGRAM

(71) Applicant: DENSO CORPORATION, Kariya, Aichi-pref. (JP)

(72) Inventor: Takashi Ooi, Aichi-ken (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 256 days.

(21) Appl. No.: 14/397,036

(22) PCT Filed: Apr. 15, 2013

(86) PCT No.: PCT/JP2013/061161
§ 371 (c)(1),
(2) Date: Oct. 24, 2014

(87) PCT Pub. No.: WO2013/161600
PCT Pub. Date: Oct. 31, 2013

(65) Prior Publication Data
US 2015/0070501 A1     Mar. 12, 2015

(30) Foreign Application Priority Data
Apr. 27, 2012    (JP) .................. 2012-103327

(51) Int. Cl.
*B60R 1/00*     (2006.01)
*G06K 9/00*     (2006.01)
(Continued)

(52) U.S. Cl.
CPC ............ *G06K 9/00798* (2013.01); *B60R 1/00* (2013.01); *B60R 21/00* (2013.01); *G06T 7/0083* (2013.01);
(Continued)

(58) Field of Classification Search
CPC ................................ B60R 1/00; G06T 7/0083
See application file for complete search history.

(56) References Cited

U.S. PATENT DOCUMENTS

| | | | |
|---|---|---|---|
| 2005/0209748 A1 | 9/2005 | Watanabe et al. | |
| 2011/0022317 A1* | 1/2011 | Okita | B60W 30/12 701/301 |
| 2012/0070088 A1* | 3/2012 | Yoshimi | G06T 7/0042 382/199 |

FOREIGN PATENT DOCUMENTS

| | | |
|---|---|---|
| JP | 2001124570 A | 5/2001 |
| JP | 2003067896 A | 3/2003 |

(Continued)

OTHER PUBLICATIONS

International Search Report (in Japanese with English Translation) for PCT/JP2013/061161, mailed May 14, 2013; ISA/JP.

(Continued)

*Primary Examiner* — William C Vaughn, Jr.
*Assistant Examiner* — Jerry Jean Baptiste
(74) *Attorney, Agent, or Firm* — Harness, Dickey & Pierce, P.L.C.

(57) ABSTRACT

In a cruising lane deviation detection system, when a boundary line is detected, a paint line drawn on a road surface to the left and right of an own vehicle is detected and a virtual line is set based on the position of a previously detected boundary line. The boundary line is set using at least either of the paint line and the virtual line. However, approach information indicating that the own vehicle is approaching a toll booth is acquired. When the approach information is acquired, setting of the virtual line as the boundary line is prohibited. Furthermore, whether or not there is risk of the own vehicle deviating from the boundary line is determined. When there is risk of deviation, an output that there is risk (Continued)

of deviation is performed. As a result, setting an erroneous virtual line as the boundary line can be suppressed.

12 Claims, 8 Drawing Sheets

(51) Int. Cl.
*G08G 1/0962* (2006.01)
*G08G 1/16* (2006.01)
*G06T 7/00* (2017.01)
*B60R 21/00* (2006.01)
*G06T 7/12* (2017.01)

(52) U.S. Cl.
CPC ........... *G06T 7/12* (2017.01); *G08G 1/09626* (2013.01); *G08G 1/167* (2013.01); *G06T 2207/30256* (2013.01)

(56) References Cited

FOREIGN PATENT DOCUMENTS

| JP | 2003099890 A | 4/2003 |
|----|--------------|--------|
| JP | 2005258846 A | 9/2005 |
| JP | 4730406 B2 | 7/2011 |
| JP | 4752311 B2 | 8/2011 |

OTHER PUBLICATIONS

Written Opinion for PCT/JP2013/061161, mailed May 14, 2013; ISA/JP.

International Preliminary Report on Patentability (in Japanese with English Translation) for PCT/JP2013/061161, issued Oct. 28, 2014.

* cited by examiner

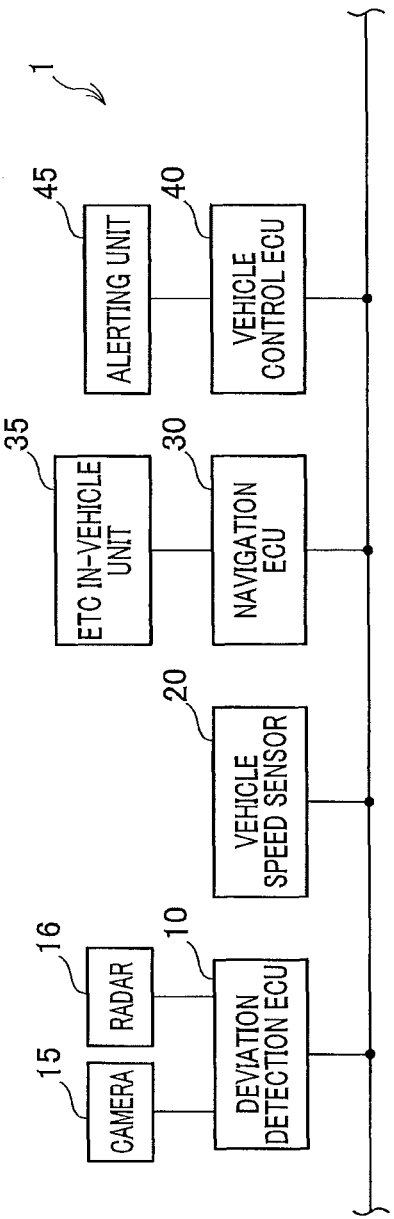
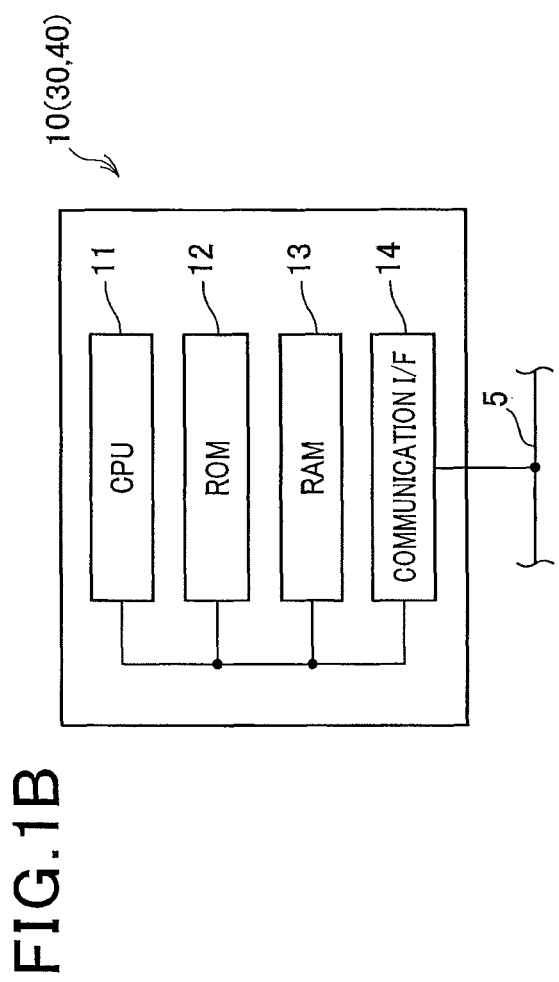
FIG.1A
FIG.1B

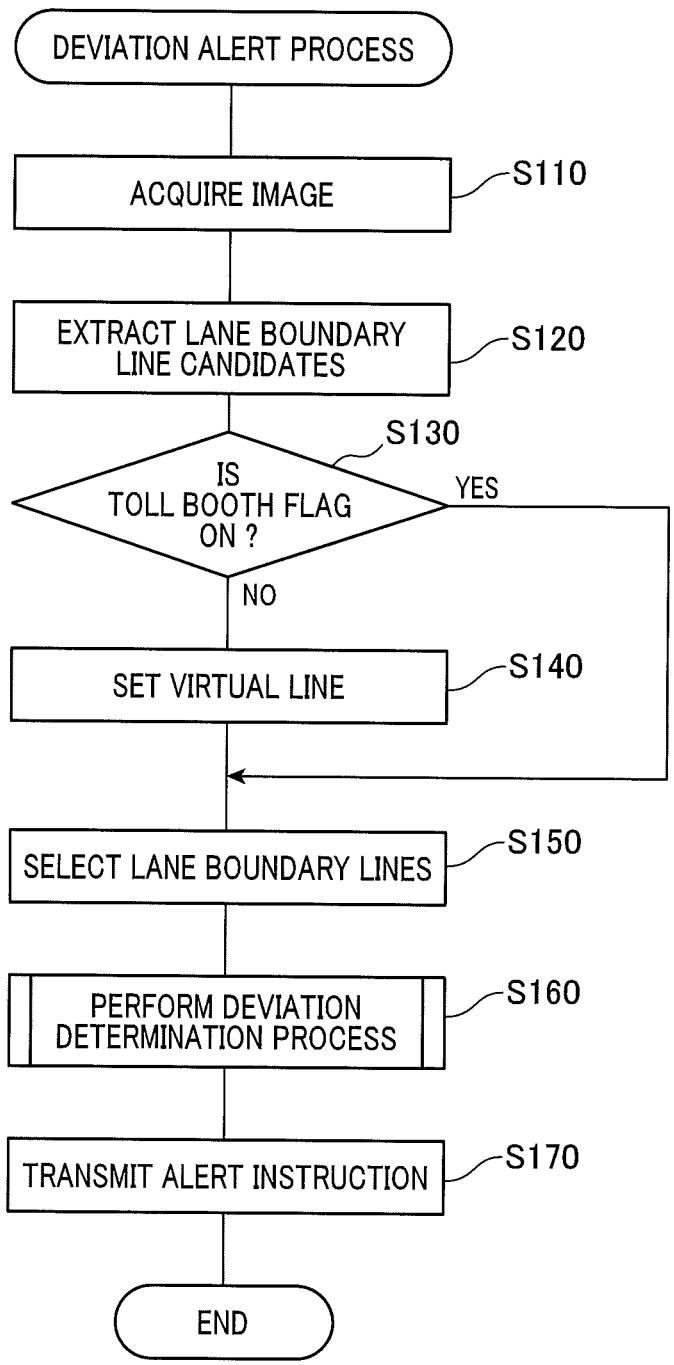

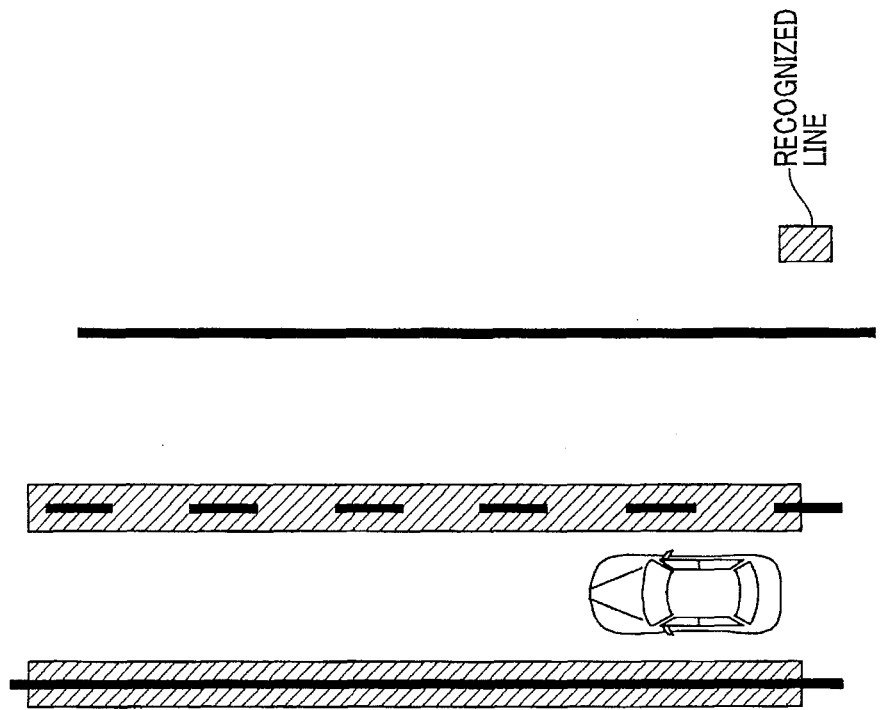
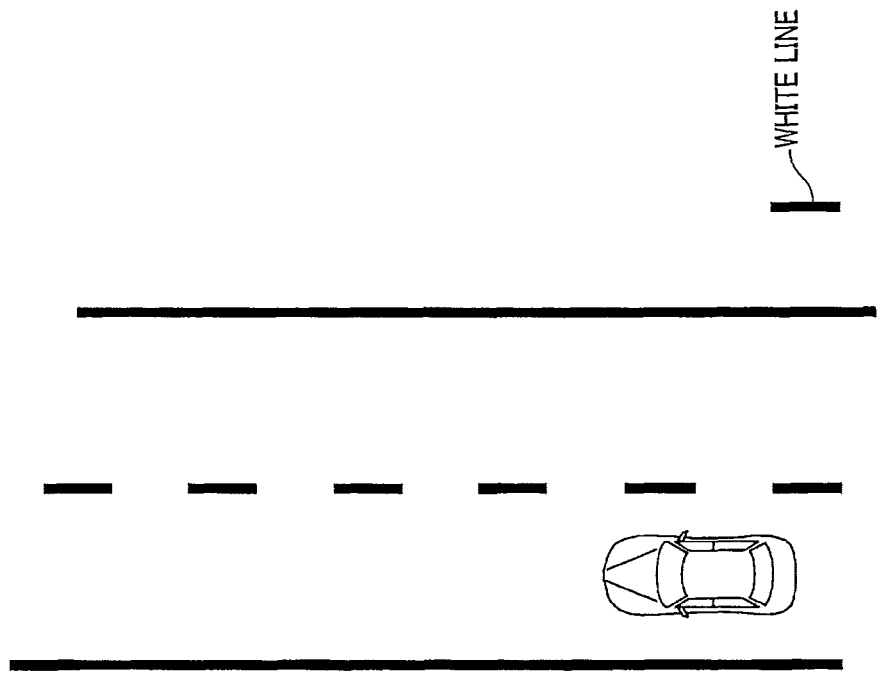

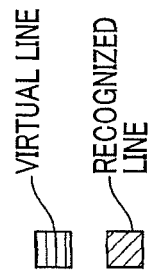
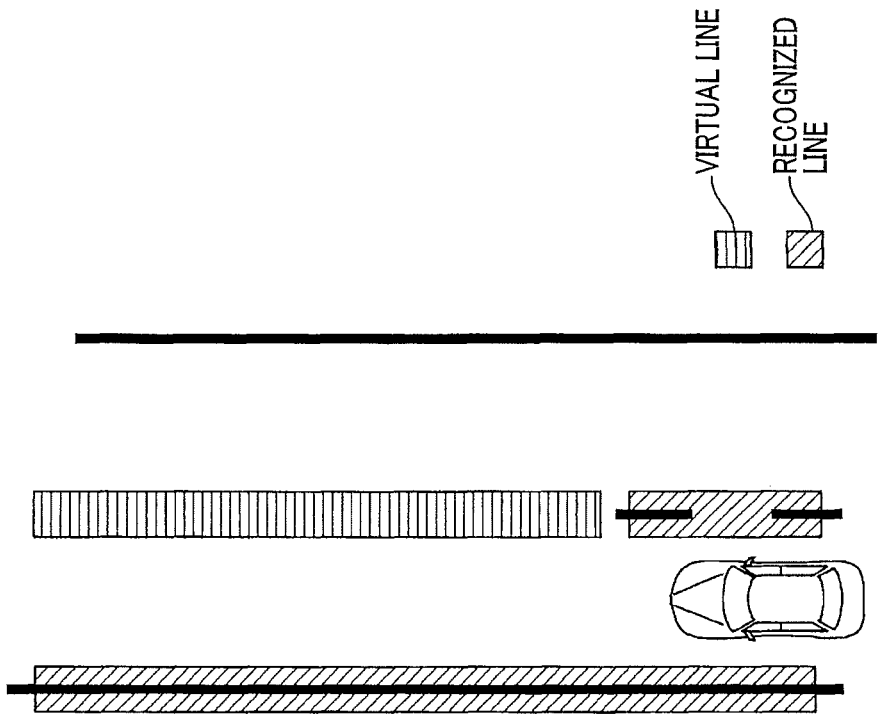
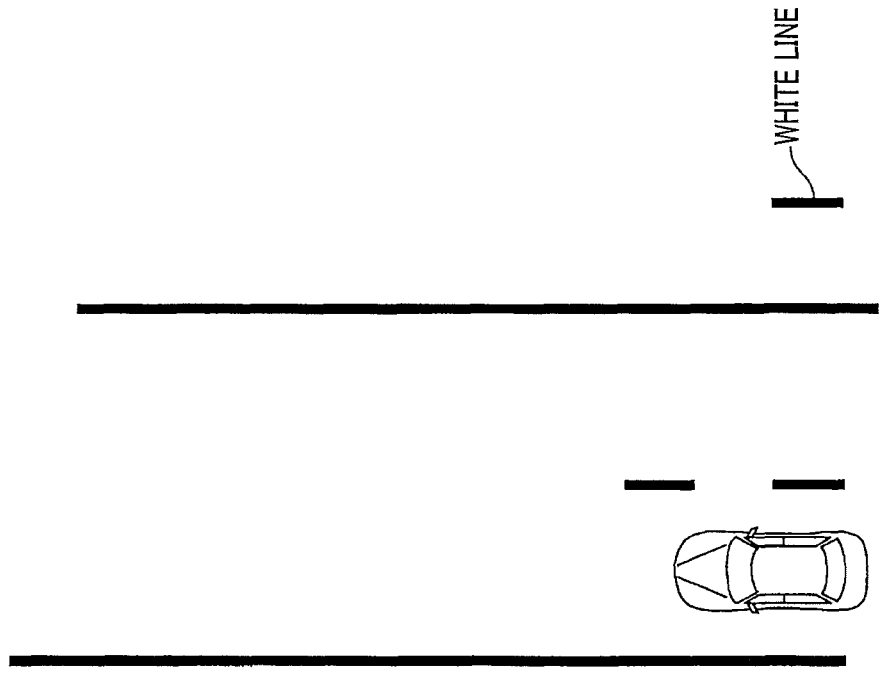

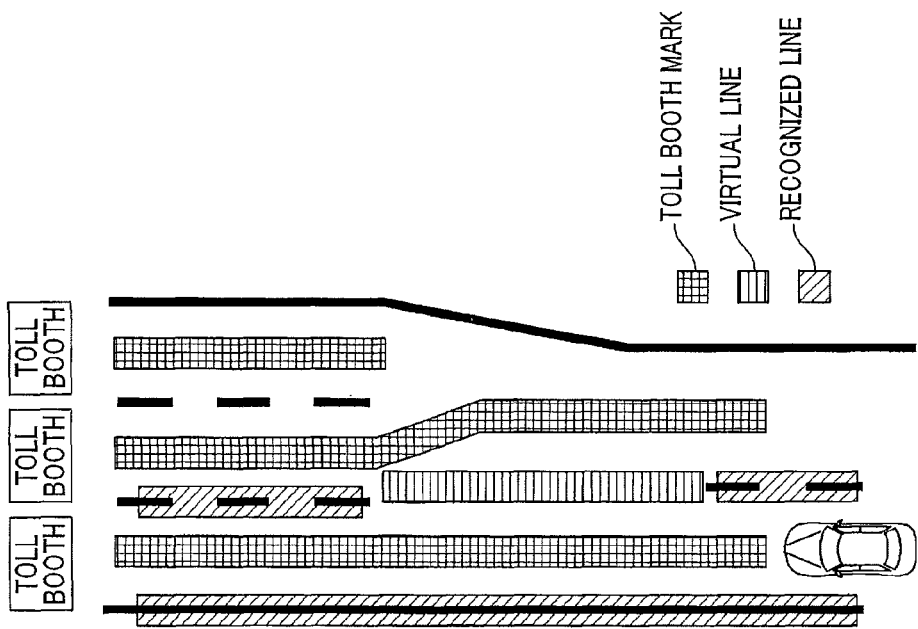
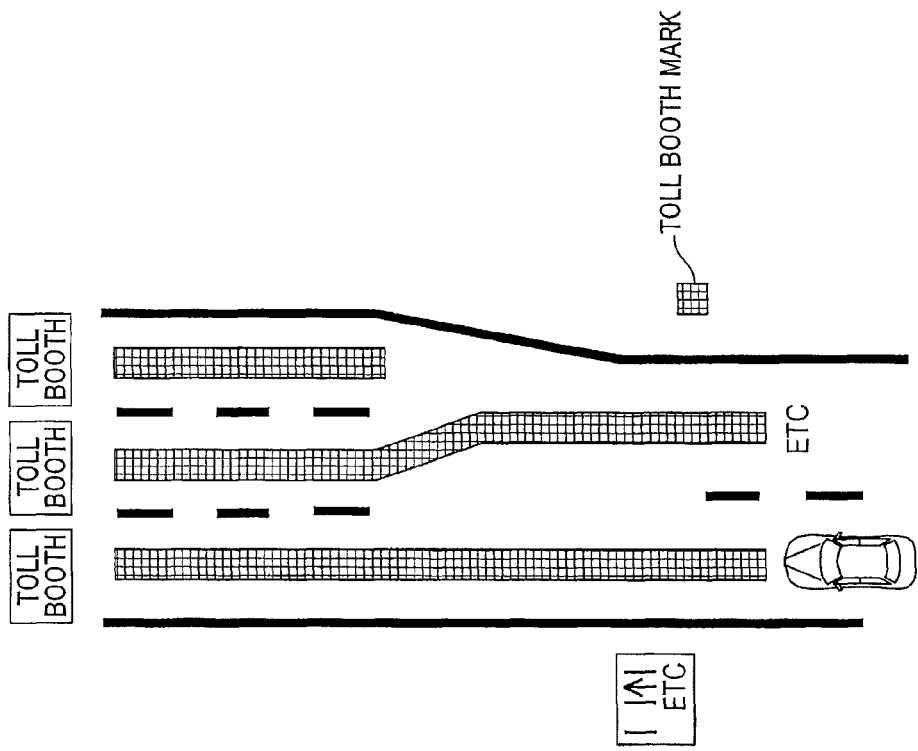

US 9,665,779 B2

BOUNDARY-LINE-DETECTING DEVICE, BOUNDARY-LINE-DEVIATION DETECTING DEVICE, AND BOUNDARY-LINE-DETECTION PROGRAM

CROSS REFERENCE TO RELATED APPLICATIONS

This application is a U.S. National Phase Application under 35 U.S.C. 371 of International Application No. PCT/JP2013/061161 filed on Apr. 15, 2013 and published in Japanese as WO 2013/161600 A1 on Oct. 31, 2013. This application is based on and claims the benefit of priority from Japanese Patent Application No. 2012-103327 filed Apr. 27, 2012. The entire disclosures of all of the above applications are incorporated herein by reference.

BACKGROUND OF THE INVENTION

Field

The present invention relates to a boundary line detecting device that is mounted in a vehicle and detects a boundary line (cruising lane marker) that demarcates the inside and outside of a cruising area in which an own vehicle is traveling, a boundary line deviation detecting device that detects deviation from the boundary line, and a boundary line detection program.

As a device that detects a boundary line that is a cruising lane marker of a vehicle, a device is known in which, when an obstacle is detected within a captured image from the vehicle, a virtual line that circumvents the obstacle is set and the vehicle is guided with the virtual line as the boundary line (refer to, for example, PTL 1).

PTL 1 JP-B-4752311

SUMMARY

The above-described technology is also effective when the vehicle is guided by a virtual line being set in a captured image in cases where the boundary line, such as a white line, cannot be detected. However, in an area in which the width of the cruising area (cruising lane) differs from the ordinary width, such as near the entrance of a toll booth, setting a virtual line may not necessarily be appropriate. When a virtual line is set in such areas, for example, the vehicle may be inhibited from moving across the virtual line such as to move to an available toll booth.

Therefore, in light of such issues, an object of the present invention is to enable suppression of the setting of an erroneous virtual line as a boundary line in a boundary line detecting device and a boundary line detection program for detecting a boundary line that demarcates the inside and outside of a cruising area in which an own vehicle is traveling.

To achieve the object such as this, a boundary line detecting device provided by the present application as a typical example is a boundary line detecting device (10) that is mounted in a vehicle and detects a boundary line demarcating the inside and outside of a cruising area in which the own vehicle is traveling, the boundary line detecting device including: a paint line detecting unit (15, 10, S120) that detects a paint line drawn on a road surface to the left and right of the own vehicle; and a virtual line setting unit (10, S140) that sets a virtual line based on a position of a previously detected boundary line.

The boundary line detecting device (10) further includes: a boundary line setting unit (10, S150) that sets the boundary line using at least either of the paint line and the virtual line; and a setting prohibiting unit (10, S130) that acquires approach information indicating that the own vehicle is approaching a toll booth and prohibits the boundary line setting unit from setting of the virtual line as the boundary line when the approach information is acquired.

According to the boundary line detecting device such as this, the virtual line can be prevented from being used as the boundary line in an area near a toll booth in which the probability is high that a virtual line will be erroneously detected. Therefore, setting an erroneous virtual line as the boundary line can be suppressed.

In addition, to achieve the above-described object, a boundary line deviation detecting device provided by the present application as a typical example includes: a boundary line detecting unit (10, 15, 16, S110 to S150) that detects a boundary line demarcating the inside and outside of a cruising area in which the own vehicle is traveling; a deviation determining unit (10, 15, 16, S160) that determines whether or not there is risk of the own vehicle deviating from the boundary line; and an output unit (10, S170) that performs output that there is risk of deviation when there is risk of deviation. The boundary line detecting unit is configured by the above-described boundary line detecting device.

According to the boundary line deviation detecting device such as this, when there is risk of the own vehicle deviating from the cruising area, output of the deviation risk warning can be performed. At this time, output of an erroneous virtual line as the boundary line can be suppressed. Therefore, control based on the output that there is risk of deviation can be accurately performed.

To achieve the above-described object, a boundary line detection program may be provided that enables the function as each means configuring the above-described device.

BRIEF DESCRIPTION OF THE DRAWINGS

In the accompanying drawings:

FIG. 1A is a block diagram showing an overall configuration of a cruising lane deviation detection system to which the present invention is applied;

FIG. 1B is a block diagram showing a configuration of a deviation detection ECU;

FIG. 2 is a flowchart of a deviation alert process performed by the deviation detection ECU;

FIGS. 3A and 3B are bird's eye views of a specific example when a virtual line is not required to be set;

FIGS. 4A and 4B are bird's eye views of a specific example when a virtual line is set;

FIGS. 5A and 5B are bird's eye views of a specific example when a virtual line is set near a toll booth;

DETAILED DESCRIPTION OF THE PREFERRED EMBODIMENTS

Figure 6:
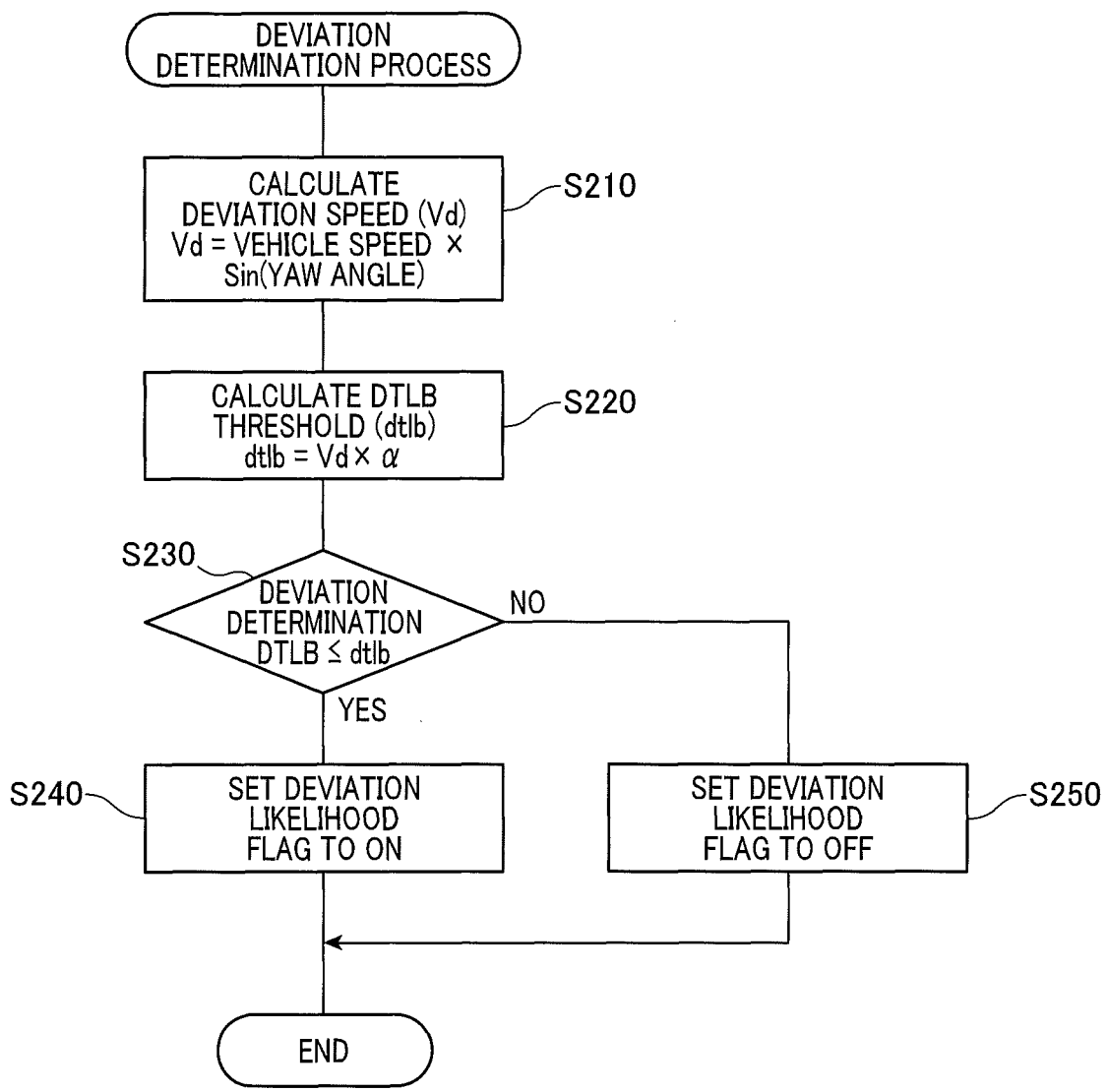
FIG. 6 is a flowchart of a deviation determination process within the deviation alert process.

An embodiment of the present invention will hereinafter be described together with the drawings.

System Configuration According to the Present Embodiment

A cruising lane deviation detection system 1 is mounted in a vehicle, such as a passenger car. The cruising lane deviation detection system 1 detects a boundary line, such as a white line, that demarcates the inside and outside of a cruising lane (cruising area) in which the vehicle (own vehicle) is traveling from an area outside of the cruising lane. When the own vehicle attempts to deviate from the boundary line, the cruising lane deviation detection system 1 detects this situation. The cruising lane deviation detection system 1 according to the present embodiment also provides a function for performing a predetermined output, such as issuing an alert, when there is risk of the vehicle deviating from the cruising lane.

More specifically, as shown in FIG. 1A, the cruising lane deviation detection system 1 is configured so that a deviation detection electronic control unit (ECU) 10, a vehicle speed sensor 20, a navigation ECU 30, and a vehicle control ECU 40 are connected to a communication line 5 and are capable of communication. The communication line 5 performs communication based on a protocol such as controller area network (CAN). In addition, a camera 15 and a radar 16 are connected to the deviation detection ECU 10.

The camera 15 is disposed so as to be capable of capturing an image of the road surface in the traveling direction of the vehicle (direction including the area ahead of the vehicle). In addition, the radar 16 is configured as a known radar that transmits radio waves or electromagnetic waves, such as laser light, ahead of the vehicle and detects reflected waves thereof. The radar 16 thereby detects the position and overall shape of a forward object that is present ahead of the vehicle. The deviation detection ECU 10 can acquire captured images and forward-object detection results from the camera 15 and the radar 16 at an arbitrary timing.

In addition, an electronic toll collection (ETC) (registered trademark) in-vehicle unit 35 is connected to the navigation ECU 30. The navigation ECU 30 is configured so as to be capable of acquiring information indicating that the vehicle is approaching or has passed a toll booth gate and toll booth passage information, such as a toll accounting results, from the ETC in-vehicle unit 35. In addition, the navigation ECU 30 can provide the toll booth passage information based on a request from the deviation detection ECU 10.

As shown in FIG. 1B, the deviation detection ECU 10 is configured as a known microcomputer that includes a central processing unit (CPU) 11, a read-only memory (ROM) 12, a random access memory (RAM) 13, and the like. The deviation detection ECU 10 acquires information required for detecting the boundary line (cruising lane marker) of the cruising lane of the vehicle from the camera 15 and the radar 16. In addition, when there is risk of the vehicle deviating from the cruising lane, the deviation detection ECU 10 outputs notification of the risk to the vehicle control ECU 40 via a communication interface (I/F) 14. Such processes are performed based on programs stored in the ROM 12 (including a boundary line detection program). The basic hardware configurations of the navigation ECU 30 and the vehicle control ECU 40 are similar to that of the deviation detection ECU 10. Therefore, descriptions thereof are omitted.

In addition, an alerting unit 45, configured by a speaker or a display lamp, is connected to the vehicle control ECU 40. The vehicle control ECU 40 operates the alerting unit 45 under instruction from the deviation detection ECU 10. As a result, when the vehicle is attempting to deviate or has deviated from the cruising lane, an occupant in the vehicle is notified of this fact. However, the vehicle control ECU 40 can also function as a steering torque control unit for preventing traffic accidents in advance by controlling steering torque so that the vehicle does not deviate from the cruising lane.

Processes According to the Present Embodiment

A process for issuing an alert when there is risk of the vehicle deviating from the cruising lane will be described. The process is performed by the cruising lane deviation detection system 1 configured as described above.

A deviation alert process shown in FIG. 2 is started when the power supply of the vehicle, such as an ignition switch, is turned ON. The process is then repeatedly performed at a fixed time interval (such as every 100 ms). Specifically, as shown in FIG. 2, first, the deviation detection ECU 10 detects the left and right boundary lines of the cruising lane of the vehicle from the captured image capturing the traveling direction of the vehicle, and sets the left and right boundary lines (S110 to S150). Specifically, first, the deviation detection ECU 10 acquires a captured image capturing the traveling direction of the vehicle from the camera 15 (S110).

Next, the deviation detection ECU 10 extracts lane boundary line candidates (traveling direction components) from the captured image capturing the traveling direction of the vehicle (S120). The lane boundary line candidates indicate a plurality of edge components arrayed in sequence along the traveling direction of the vehicle as paint lines (lane boundary lines) drawn on the road surface on the left and right sides ahead of the own vehicle. Specifically, the deviation detection ECU 10 extracts a pixel, among the plurality of pixels configuring a horizontal line in the captured image, of which the rate of change in luminance value from that of an adjacent pixel is a reference value or higher, as an edge point. Then, the deviation detection ECU 10 performs a known Hough transform process, thereby detecting all linear patterns extending in the traveling direction of the vehicle (of which an angle formed with the traveling direction of the vehicle [yaw angle] is less than a certain value). The deviation detection ECU 10 then labels each linear pattern as a lane boundary line candidate.

More specifically, when white lines are present on both the left and right sides of the vehicle as shown in FIG. 3A, the white lines to the left and right of the vehicle serve as recognized lines as shown in FIG. 3B. The recognized lines are subsequently set as the lane boundary lines. The lane boundary line is set continuously regardless of the white line on the road being a solid line or a broken line.

Next, the deviation detection ECU 10 determines whether or not a "toll booth flag" is in an ON state by acquiring a flag state (approach information) from the RAM 13 (S130). The "toll booth flag" indicates that the vehicle is approaching a toll booth. Various specific examples for determining whether or not the vehicle is approaching a toll both will be described hereafter. When determined that the toll booth flag is in the ON state (YES at S130), the deviation detection ECU 10 proceeds to the process at S150 without setting a virtual line (in other words, prohibits setting a virtual line as the boundary line).

When determined that the toll booth flag is in an OFF state (NO at S130), the deviation detection ECU 10 sets a virtual line (S140). In this process, the virtual line is set based on the position of a previously (most recently) detected boundary line when, for example, the paint line cannot be detected from the captured image. Specifically, for example, the position of the boundary line within the captured image that has been detected in the previous process is estimated based on the vehicle speed and the steering angle of the own vehicle. The virtual line is then set on an extension of the boundary line.

More specifically, as shown in FIG. 4A for example, the virtual line is set when the paint line has become light and cannot be detected, or is not present. Specifically, as shown in FIG. 4B, the virtual line is set on the extension of the boundary line that has been recognized earlier. However, when the virtual line is set near a toll booth such as that shown in FIGS. 5A and 5B, the width of the cruising lane often changes near the toll booth. Inconsistencies with the actual cruising lane may occur. Therefore, according to the present embodiment, the virtual line is not set near the toll both (when the toll booth flag is ON).

The deviation detection ECU 10 then selects the lane boundary lines using at least either of the paint lines and the virtual lines (S150). In this process, the most probable paint lines or virtual lines that are lane boundary line candidates on the right side and the left side of the own vehicle are set as the lane boundary lines. The set boundary lines are then recorded in the RAM 13. The most probable line can be a line having the highest probability based on an arbitrary method, such as a line having the highest number of votes during Hough transform.

The deviation detection ECU 10 then performs a deviation determination process (S160). In the deviation determination process, a speed of approach at which the vehicle approaches the lane boundary line is detected based on the vehicle speed acquired from the vehicle speed sensor 20, and the likelihood of the vehicle deviating from the detected cruising lane is determined based on the speed of approach. Specifically, as shown in FIG. 6, first, with the speed of approach at which the vehicle approaches the lane boundary line as a deviation speed (Vd), the deviation speed (Vd) is calculated by the product of yaw angle (angle formed by the extending direction of the lane boundary line and the traveling direction of the vehicle) and the vehicle speed (S210). The yaw angle is determined during the Hough transform process at S120, described above. The value of the yaw angle is recorded in the RAM 13 during the process at S120.

Next, the deviation detection ECU 10 calculates a threshold (dtlb) of an end portion distance (DTLB) (S220). The threshold (dtlb) can be determined from the product of the deviation speed (Vd) and a reference time (a) (such as two seconds).

Next, the deviation detection ECU 10 compares the end portion distance (DTLB) and the threshold (dtlb), thereby determining whether or not the vehicle will deviate from the cruising lane within the reference time (S230). When determined that the end portion distance (DTLB) is the threshold (dtlb) or less (YES at S230), the deviation detection ECU 10 determines that the vehicle will deviate from the cruising lane and sets a "deviation likelihood flag" in the RAM 13 to an ON state (S240). The deviation detection ECU 10 then ends the deviation determination process. On the other hand, when determined that the end portion distance (DTLB) is greater than the threshold (dtlb) (NO at S230), the deviation detection ECU 20 determines that the vehicle will not deviate from the cruising lane and sets the deviation probability flag in the RAM 13 to an OFF state (S250). The deviation detection ECU 10 then ends the deviation determination process.

Next, returning to FIG. 2, the deviation detection ECU 10 references the "deviation likelihood flag" in the RAM 13. When the deviation likelihood flag is in the ON state (the deviation likelihood is higher than a predetermined reference value), the deviation detection ECU 10 gives (outputs) an instruction to the vehicle control ECU 40 to issue an alert to the occupant of the vehicle that there is a likelihood of deviation (S170). The vehicle control ECU 40 that has received in the instruction immediately issues the alert via the alerting unit 45. The deviation alert process is then completed.

Figure 7A:
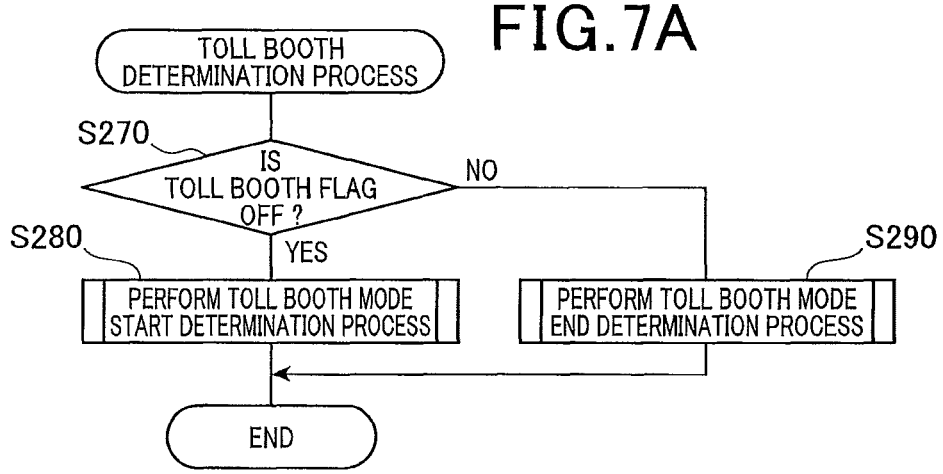
FIG. 7A is a flowchart of a toll booth determination process.

Next, a process performed to determine whether or not the vehicle is approaching a toll booth will be described with reference to FIGS. 7A, 7B and FIG. 8. In a toll booth determination, whether or not the vehicle is approaching the toll booth is determined when the vehicle has not yet approached the toll booth. When the vehicle is already approaching the toll booth, whether or not the vehicle has passed the toll booth is determined. Specifically, as shown in FIG. 7A, first, whether or not the toll booth flag is in an OFF state is determined (S270).

When determined that the toll booth flag is in the OFF state (YES at S270), the deviation detection ECU 10 performs a toll booth mode start determination process described hereafter (S280). When the toll booth mode start determination process is completed, the toll booth determination process is completed. When determined that the toll booth flag is in the ON state (NO at S270), the deviation detection ECU 10 performs a toll booth mode end determination process (S290). When the toll booth mode end determination process is ended, the toll booth determination process is ended.

Figure 7B:
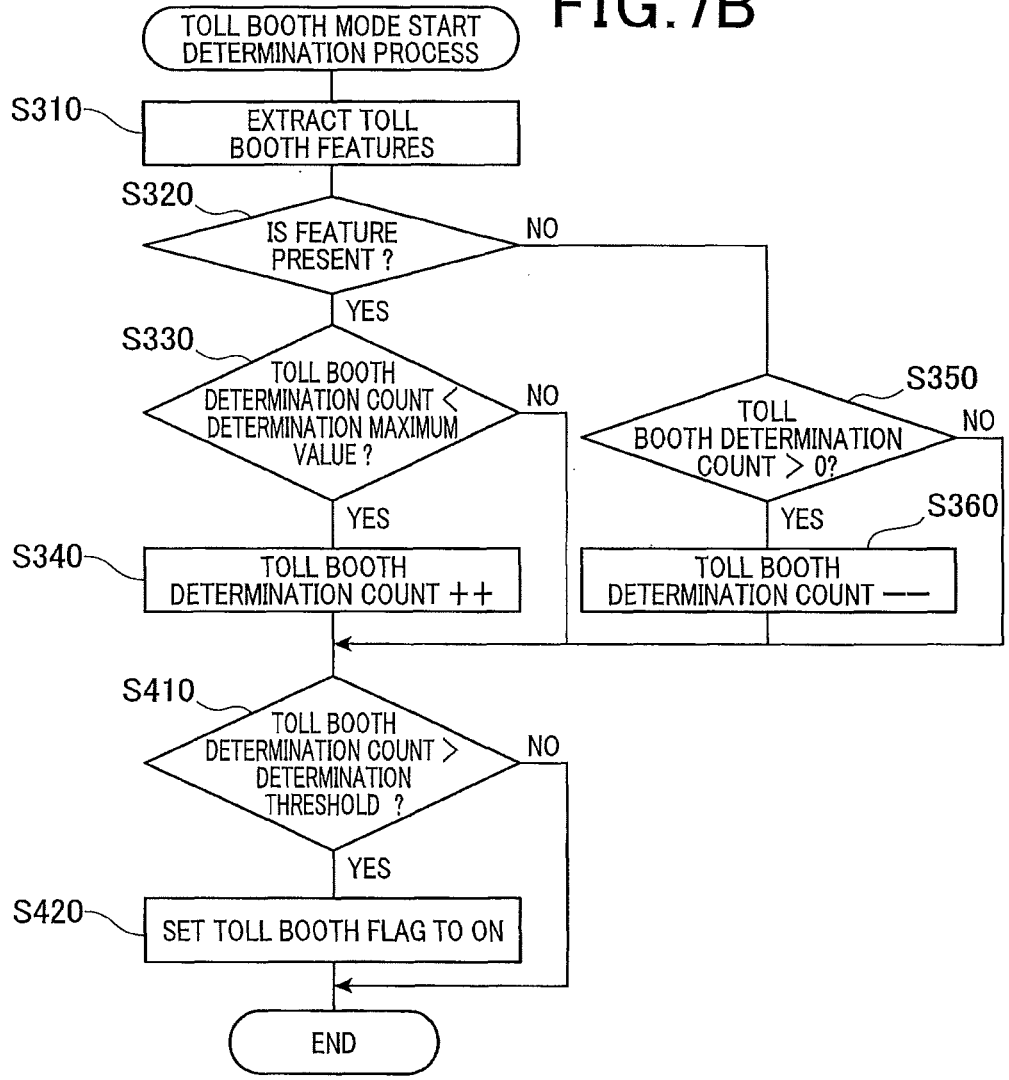
FIG. 7B is a flowchart of a toll booth mode start determination process within the toll booth determination process.

In the toll booth mode start determination process, as shown in FIG. 7B, the deviation detection ECU 10 extracts a target that is similar in shape or pattern to toll booth feature templates recorded in the ROM 12 in advance, from the captured image from the camera 15 (S310). In this process, for example, the characters ETC disposed near a toll booth, a paint pattern unique to the area near a toll booth, the structure of the toll booth itself, and the like are recorded as templates. A pattern similar to such templates is extracted using a known pattern matching method.

Next, the deviation detection ECU 10 determines whether or not a feature of a toll booth is present (S320). When determined that a feature of a toll booth is present (YES at S320), the deviation detection ECU 10 compares a toll booth determination count (a counter having an initial value of zero) and a determination maximum value (maximum value of the counter) (S330).

When determined that the toll booth determination count is lower than the determination maximum value (YES at S330), the deviation detection ECU 10 increments the toll both determination count (S340) and proceeds to the process at S410. When determined that the toll booth determination count is the determination maximum value or higher (NO at S330), the deviation detection ECU 10 immediately proceeds to the process at S410.

In addition, when determined at S320 that a feature of the toll booth is not present (NO at S320), the deviation detection ECU 10 compares whether or not the toll booth determination count is higher than zero (S350). When determined that the toll booth determination count is higher than zero (YES at S350), the deviation detection ECU 10 decrements the toll booth determination count (S360) and proceeds to the process at S410. When determined that the toll booth determination count is zero or lower (NO at S350), the deviation detection ECU 10 immediately proceeds to S410.

Next, in the process at S410, the deviation detection ECU 10 compares the toll booth determination count with a determination threshold for determining whether or not the area is a toll booth. The determination threshold is set to a value of one or higher and is particularly preferably two or higher.

When determined that the toll booth determination count is higher than the determination threshold (YES at S410), the deviation detection ECU 10 sets the toll booth flag to ON (S420) and ends the toll booth mode start determination process. When determined that the toll booth determination count is the determination threshold or lower (NO at S410), the deviation detection ECU 10 immediately ends the toll booth mode start determination process.

Figure 8:
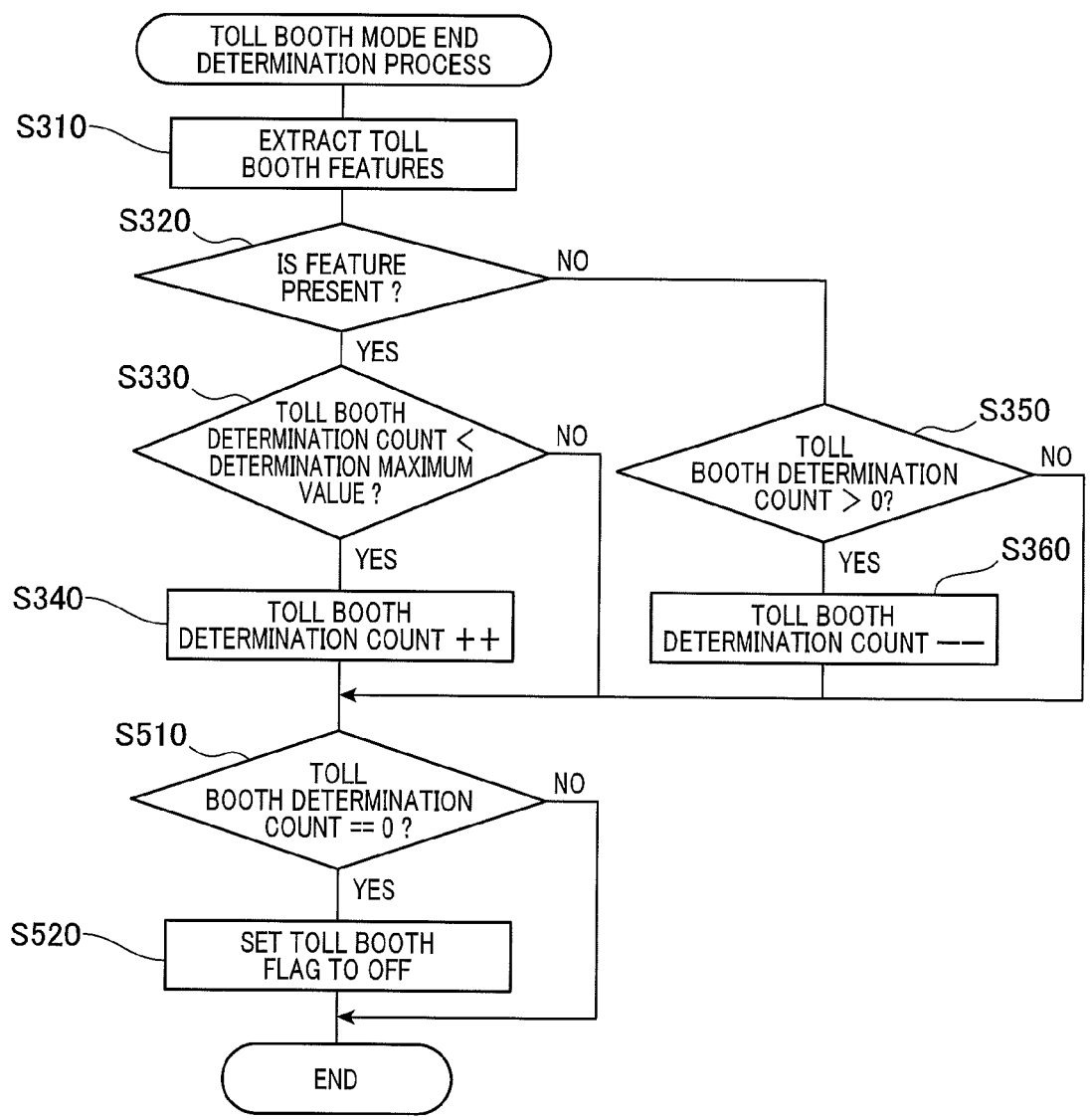
FIG. 8 is a flowchart of a toll booth mode end determination process within the toll booth determination process.

Next, in the toll booth mode end determination process, as shown in FIG. 8, instead of the processes at S410 and S420 in the toll booth mode start determination process, the processes at S510 and S520 are performed. Specifically, the deviation detection ECU 10 determines whether or not the toll booth determination count is zero (or zero or lower) (S510). When determined that the toll booth determination count is zero (YES at S510), the deviation detection ECU 10 sets the toll booth flag to OFF (S520) and ends the toll booth mode end determination process. When determined that the toll booth determination count is higher than zero (NO at S510), the deviation detection ECU 10 immediately ends the toll booth mode end determination process.

Effects According to the Present Embodiment

In the cruising lane deviation detection system 1 described in detail as above, the deviation detection ECU 10 detects the boundary line that demarcates the inside and outside of the cruising area in which the own vehicle is traveling. The deviation detection ECU 10 determines whether or not there is risk of the own vehicle deviating from the boundary line. When there is risk of deviation, the deviation detection ECU 10 outputs this fact. In particular, the own vehicle travels while the deviation detection ECU 10 detects the paint lines (white lines) actually drawn on the road surface to the left and right ahead of the own vehicle, when the boundary line is being detected. When the boundary line ends, the deviation detection ECU 10 sets a virtual line based on the position of the previously (most recently) detected boundary line.

The deviation detection ECU 10 sets the boundary line using at least either of the paint line and the virtual line. However, the deviation detection ECU 10 acquires the approach information indicating that the own vehicle is approaching a toll booth. When the approach information is acquired, the deviation detection ECU 10 prohibits the virtual line from being set as the boundary line.

According to the deviation detection ECU 10 such as this, the virtual line is prevented from being used as the boundary line in an area near the toll booth in which the probability is high that an erroneous virtual line will be set. Therefore, setting an erroneous virtual line as the boundary line can be suppressed. Vehicular accidents can be prevented in advance.

In addition, according to the cruising lane deviation detection system 1 such as this, when there is risk of the own vehicle deviating from the cruising area, output of this risk can be performed. At this time, output for setting an erroneous virtual line as the boundary line can be suppressed. Therefore, control based on the output of the fact that there is risk of deviation can be accurately performed.

In addition, the deviation detection ECU 10 in the cruising lane deviation detection system 1 determines whether or not the own vehicle is approaching a toll booth based on the captured image capturing the travelling direction of the own vehicle. The deviation detection ECU 10 then determines whether or not to set the virtual line as the boundary line using the determination result.

According to the cruising lane deviation detection system 1 such as this, the cruising lane deviation detection system 1 itself is capable of detecting the approach information without receiving transmission of the approach information from an external source. Furthermore, the deviation detection ECU 10 in the cruising lane deviation detection system 1 outputs the approach information when an object unique to the toll booth is detected in the captured image.

According to the cruising lane deviation detection system 1 such as this, when an object unique to the toll booth that is stored in the memory in advance is detected, the approach information can be outputted. In addition, the deviation detection ECU 10 in the cruising lane deviation detection system 1 outputs the approach information when an area is detected as being a toll booth a reference number of times or more, the reference number of times being set to a plurality of number of times.

According to the cruising lane deviation detection system 1 such as this, compared to a configuration in which the approach information is outputted immediately after an area is detected as being a toll booth once, the probability of an area being erroneously recognized as a toll booth can be reduced.

Furthermore, the deviation detection ECU 10 in the cruising lane deviation detection system 1 outputs the approach information when a paint mark on the road that indicates a toll booth is detected. In Japan, the paint mark on the road is equivalent to, for example, the characters "ETC" and blue and white stripe patterns. In the Republic of Korea, the paint mark is equivalent to, for example, a plurality of blue lines disposed at each gate.

In addition, the deviation detection ECU 10 in the cruising lane deviation detection system 1 notifies the occupant of the own vehicle when the fact that there is risk of deviation is outputted. According to the cruising lane deviation detection system 1 such as this, an alert or the like can be issued when there is risk of deviation. As notification, the occupant of the own vehicle can be notified of impending danger by sound or light.

Other Embodiments

The embodiment of the present invention is not limited in any way to the above-described embodiment. Various embodiments are possible within the technical scope of the present invention.

For example, according to the above-described embodiment, notification is given when there is risk of deviation. However, the above-described deviation detection ECU 10 or cruising lane deviation detection system 1 may be used in an automatic driving device or a steering assistance device that automatically performs steering to remain within the cruising area. In this configuration, when there is risk of deviation, driving assistance may be performed so as to perform steering in a direction suppressing deviation.

In addition, when the above-described deviation detection ECU 10 or cruising lane deviation detection system 1 is used in the automatic driving device or the steering assistance device, when the boundary line cannot be set (such as when the vehicle is approaching a toll booth and the virtual line cannot be set as the boundary line), the fact that the boundary line cannot be set is outputted. When this output is performed, a process for performing automatic steering can be ended.

Furthermore, according to the above-described embodiment, whether or not the vehicle is approaching a toll booth is determined based on the captured image. However, the approach information regarding the approach to a toll booth may be acquired from an external source. For example, the approach information may be acquired when external input is received, such as a toll booth proximity notification received by the ETC in-vehicle unit 35 from the toll booth, card-insertion reminder notification service (notification given by a "beep" sound), or notification that another vehicle has paid at the toll booth by inter-vehicle communication.

Relationship between the Embodiment and the Scope of Claims

The cruising lane deviation detection system 1 according to the present embodiment corresponds to a boundary line deviation detecting device of the present invention. The deviation detection ECU 10 corresponds to a boundary line detecting device in the scope of claims. In addition, the camera 15, the radar 16, the deviation detection ECU 10, and the processes at S110 to S150 correspond to a boundary line detecting unit in the scope of claims. In particular, the camera 15, the deviation detection ECU 10, and the process at S110 correspond to an image detecting unit in the scope of claims. The camera 15, the deviation detection ECU 10, and the process at S120 correspond to a paint line detecting unit in the scope of claims. The deviation detection ECU 10 and the process at S130 correspond to a setting prohibiting unit in the scope of claims. The deviation detection ECU 10 and the process at S140 correspond to a virtual line setting unit in the scope of claims. The deviation detection ECU 10 and the process at S150 correspond to a boundary line setting unit in the scope of claims. In addition, the camera 15, the deviation detection ECU 10, and the process at S160 correspond to a deviation determining unit in the scope of claims. The deviation detection ECU 10 and the process at S170 correspond to an output unit in the scope of claims. Furthermore, the vehicle control ECU 40 and the alerting unit 45 correspond to a notification device in the scope of claims. In addition, the camera 15 (not necessarily required), the deviation detection ECU 10, and the processes at S310 to S420 and S310 to S520 correspond to a toll booth determining unit in the scope of claims. In addition, the ETC in-vehicle unit 35 and the navigation ECU 30 correspond to an approach information acquiring device that acquires information indicating that the vehicle is approaching a toll booth, from outside of the vehicle.

REFERENCE SIGNS LIST

1: cruising lane deviation detection system
5: communication line
10: deviation detection ECU
11: CPU
12: ROM
13: RAM
15: camera
16: radar
20: vehicle speed sensor
30: navigation ECU
35: ETC in-vehicle unit
40: vehicle control ECU
45: alerting unit

What is claimed is:

1. A boundary line detecting device that is mounted in a vehicle and detects a boundary line demarcating the inside and outside of a cruising area in which an own vehicle is traveling, the boundary line detecting device comprising:
   an image acquiring unit that acquires an image of a road surface on the left and right ahead of the own vehicle;
   a paint line detecting unit that detects a paint line drawn on the road surface within the image acquired by the image acquiring unit;
   a virtual line setting unit that sets a virtual line based on a position of a previously detected boundary line;
   a boundary line setting unit that sets the boundary line using at least either of the paint line and the virtual line; and
   a setting prohibiting unit that prohibits setting of the virtual line as the boundary line when approach information is acquired that indicates that the own vehicle is approaching a toll booth.

2. The boundary line detecting device according to claim 1, further comprising
   a toll booth determining unit that determines whether or not the own vehicle is approaching a toll booth based on the captured image capturing a traveling direction of the own vehicle,
   wherein
   the approach information is acquired from the toll booth determining unit.

3. The boundary line detecting device according to claim 2, wherein:
   the toll booth determining unit outputs the approach information when an object unique to a toll booth is detected within the captured image.

4. The boundary line detecting device according to claim 2, wherein;
   the toll booth determining unit outputs the approach information when an area is detected as being a toll booth a reference number of times or more, the reference number of times being set to a plurality of number of times.

5. The boundary line detecting device according to claim 2, wherein;
   the toll booth determining unit outputs the approach information when a paint mark on the road that indicates a toll booth is detected.

6. The boundary line detecting device according to claim 1, further comprising:
   a toll booth determining unit that determines whether or not the own vehicle is approaching a toll booth based on information from outside the own vehicle.

7. A boundary line deviation detecting device that is mounted in a vehicle and performs a predetermined output when there is risk of the own vehicle deviating from a cruising area, the boundary line deviation detecting device comprising:
   a boundary line detecting unit that detects a boundary line demarcating the inside and outside of the cruising area in which the own vehicle is traveling;
   a deviation determining unit that determines whether or not there is risk of the own vehicle deviating from the boundary line; and
   an output unit that performs output that there is risk of deviation when there is risk of deviation,
   wherein
   the boundary line detecting unit comprises:
      an image acquiring unit that acquires an image of a road surface on the left and right ahead of the own vehicle;
      a paint line detecting unit that detects a paint line drawn on the road surface within the image acquired by the image acquiring unit;
      a virtual line setting unit that sets a virtual line based on a position of a previously detected boundary line;

a boundary line setting unit that sets the boundary line using at least either of the paint line and the virtual line; and a setting prohibiting unit that prohibits setting of the virtual line as the boundary line when approach information is acquired that indicates that the own vehicle is approaching a toll booth.

8. The boundary line deviation detecting device according to claim 7, comprising:

an approach information acquiring unit that acquires information indicating that the vehicle is approaching a toll booth, from outside of the vehicle.

9. The boundary line deviation detecting device according to claim 7, comprising:

a notifying device that notifies an occupant of the vehicle when output is performed that there is risk of deviation.

10. A non-transient computer-readable storage medium storing a boundary line detection program for enabling a computer to function as a boundary line detecting device that is mounted in a vehicle and detects a boundary line demarcating the inside and outside of a cruising area in which an own vehicle is traveling, the boundary line detecting device comprising:

an image acquiring unit that acquires an image of a road surface on the left and right ahead of the own vehicle;

a paint line detecting unit that detects a paint line drawn on the road surface within the image acquired by the image acquiring unit;

a virtual line setting unit that sets a virtual line based on a position of a previously detected boundary line;

a boundary line setting unit that sets the boundary line using at least either of the paint line and the virtual line; and a setting prohibiting unit that prohibits setting of the virtual line as the boundary line when approach information is acquired that indicates that the own vehicle is approaching a toll booth.

11. The boundary line detecting device according to claim 2, wherein;

the toll booth determining unit outputs the approach information when an area is detected as being a toll booth a reference number of times or more, the reference number of times being set to a plurality of number of times.

12. The boundary line deviation detecting device according to claim 8, comprising:

a notifying device that notifies an occupant of the vehicle when output is performed that there is risk of deviation.

* * * * *